B. M. Lewy.
Turning Lathe.
Nº 69,685.   Patented Oct. 8, 1867.
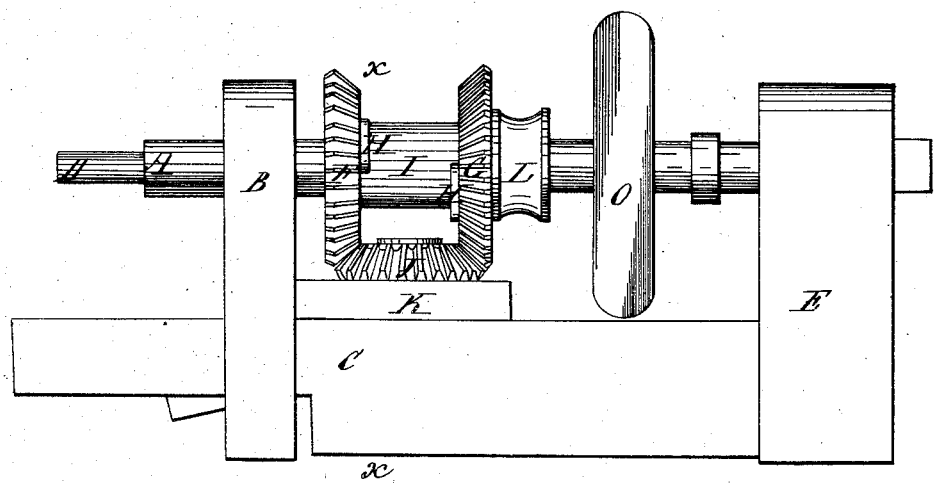
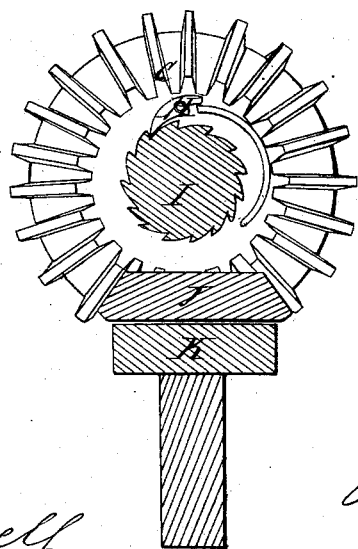
Witnesses
Theo Tusche
Wm Dian Overell
Inventor
B M Lewy
Per Munn & Co
Attorneys.

United States Patent Office.

BENJAMIN M. LEWY, OF MONTGOMERY, ALABAMA.

Letters Patent No. 69,685, dated October 8, 1867.

IMPROVEMENT IN LATHES.

The Schedule referred to in these Letters Patent and making part of the same.

TO ALL WHOM IT MAY CONCERN:

Be it known that I, BENJAMIN M. LEWY, of Montgomery, in the county of Montgomery, and State of Alabama, have invented a new and useful Improvement in Lathes; and I do hereby declare that the following is a full, clear, and exact description thereof, which will enable others skilled in the art to make and use the same, reference being had to the accompanying drawings, forming part of this specification.

The present invention relates to lathes more particularly intended for watchmakers' use, and the improvements embraced herein are represented in the accompanying plate of drawings, in which—

Figure 1 is a side view of the same, and

Figure 2 a transverse vertical section taken in the plane of the line $x\ x$, fig. 1.

Similar letters of reference indicate corresponding parts.

A, in the drawings, represents an arbor turning in upright piece B to lathe-bed C. This arbor, at its end D, forms one of the centre-pins to the lathe, and from the standard B is extended to another standard E of the bed C. F and G, two bevel gear-wheels on arbor A, between standards B and E. These wheels F and G are arranged to turn loosely on the arbor A, and on their faces, toward each other, are both provided with a similar spring-pawl, H, pointing in the same direction, and engaging with a ratchet-wheel, I, fastened to arbor A, between the said wheels F and G. Below the wheels F and G is a bevel pinion-wheel, J, arranged to loosely turn in block K of the bed-piece C, as well as to be susceptible of being raised or lowered therein, for action in the gears F and G. L, a grooved pulley, fastened to outside face of wheel G, so as to turn as one. This pulley L is provided for receiving a tow to turn it, which tow being moved forward in the proper direction for the pawl of wheel G to engage with the ratchet I, such wheel G becomes the driver. At the same time the pinion J moves the wheel F with its pawl from the ratchet, when, drawing the tow back, the wheel F, with its pawl, becomes the driver, the wheel G moving its pawl from the ratchet, whereby through such drawing of the tow a rotary motion will be imparted to the arbor. O, a balance-wheel fixed to arbor A to give steadiness of motion thereto.

I claim as new, and desire to secure by Letters Patent—

The combination of the arbor A, wheels F G, and pawl, wheel I, grooved pulley L, and pinion-wheel J, arranged substantially as and for the purpose described.

The above specification of my invention signed by me this     day of     , 1867.

B. M. LEWY.

Witnesses:
    ABEL HAWK,
    J. H. CARKEET.